United States Patent
Kitamura

(10) Patent No.: US 10,805,557 B2
(45) Date of Patent: Oct. 13, 2020

(54) IMAGE PROCESSING DEVICE, IMAGE PROCESSING METHOD AND STORAGE MEDIUM CORRECTING DISTORTION IN WIDE ANGLE IMAGING

(71) Applicant: CASIO COMPUTER CO., LTD., Shibuya-ku (JP)

(72) Inventor: Kazuhisa Kitamura, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 33 days.

(21) Appl. No.: 16/132,007

(22) Filed: Sep. 14, 2018

(65) Prior Publication Data
US 2019/0098225 A1 Mar. 28, 2019

(30) Foreign Application Priority Data

Sep. 27, 2017 (JP) ................................. 2017-186627

(51) Int. Cl.
*H04N 5/262* (2006.01)
*G06T 3/00* (2006.01)
(Continued)

(52) U.S. Cl.
CPC .......... *H04N 5/2621* (2013.01); *G02B 13/06* (2013.01); *G10L 17/26* (2013.01); *H04N 5/232* (2013.01); *H04N 5/23229* (2013.01); *H04N 5/23238* (2013.01); *H04N 5/3572* (2013.01); *H04R 3/005* (2013.01); *H04R 2420/01* (2013.01); *H04R 2430/20* (2013.01)

(58) Field of Classification Search
CPC .......... H04N 5/23238; H04N 5/23229; H04N 5/23216; H04N 5/76; H04N 7/15; H04N 7/152; H04N 7/155; H04R 2430/20; G06T 3/0018
See application file for complete search history.

(56) References Cited

U.S. PATENT DOCUMENTS 6,593,956 B1 * 7/2003 Potts ..................... G01S 3/7865
348/14.09
8,111,282 B2 * 2/2012 Cutler ..................... H04N 7/15
348/14.01
(Continued)

FOREIGN PATENT DOCUMENTS

| CN | 101897174 | 11/2010 |
|---|---|---|
| CN | 105474667 | 4/2016 |

(Continued)

OTHER PUBLICATIONS

Office Action dated Apr. 16, 2020 issued in Chinese Patent Application No. 201811104628.0.

*Primary Examiner* — Ngoc Yen T Vu
(74) *Attorney, Agent, or Firm* — Cozen O'Connor

(57) ABSTRACT

An object is to clarify a relation between a partial area on an image and a voice corresponding to the area when providing them to a user. A control section acquires an image such as a fisheye moving image stored in a storage section and a voice corresponding to this image from the storage section, specifies a partial area on a plane of the entire area of the acquired image, acquires a voice from a direction corresponding to the specified partial area among all acquired voices and outputs this voice from a loudspeaker section.

20 Claims, 13 Drawing Sheets

(51) Int. Cl.
    *H04R 3/00*            (2006.01)
    *G10L 17/26*          (2013.01)
    *G02B 13/06*          (2006.01)
    *H04N 5/232*          (2006.01)
    *H04N 5/357*          (2011.01)

(56) References Cited

U.S. PATENT DOCUMENTS

| | | | |
|---|---|---|---|
| 8,477,200 | B2 | 7/2013 | Fujita et al. |
| 9,942,518 | B1 * | 4/2018 | Tangeland .............. H04N 7/152 |
| 10,057,542 | B2 * | 8/2018 | Segal ...................... H04N 7/155 |
| 10,187,579 | B1 * | 1/2019 | Wang .................. G06K 9/00234 |
| 2010/0220552 | A1 * | 9/2010 | Owaki .................. G01S 3/8083 |
| | | | 367/127 |
| 2011/0007175 | A1 | 1/2011 | Fujita et al. |
| 2015/0146078 | A1 * | 5/2015 | Aarrestad .......... H04N 5/23212 |
| | | | 348/345 |

FOREIGN PATENT DOCUMENTS

| | | |
|---|---|---|
| JP | 2011-035524 | 2/2011 |
| JP | 2015-019162 | 1/2015 |
| JP | 2015-198413 | 11/2015 |
| JP | 6125457 | 4/2017 |

* cited by examiner

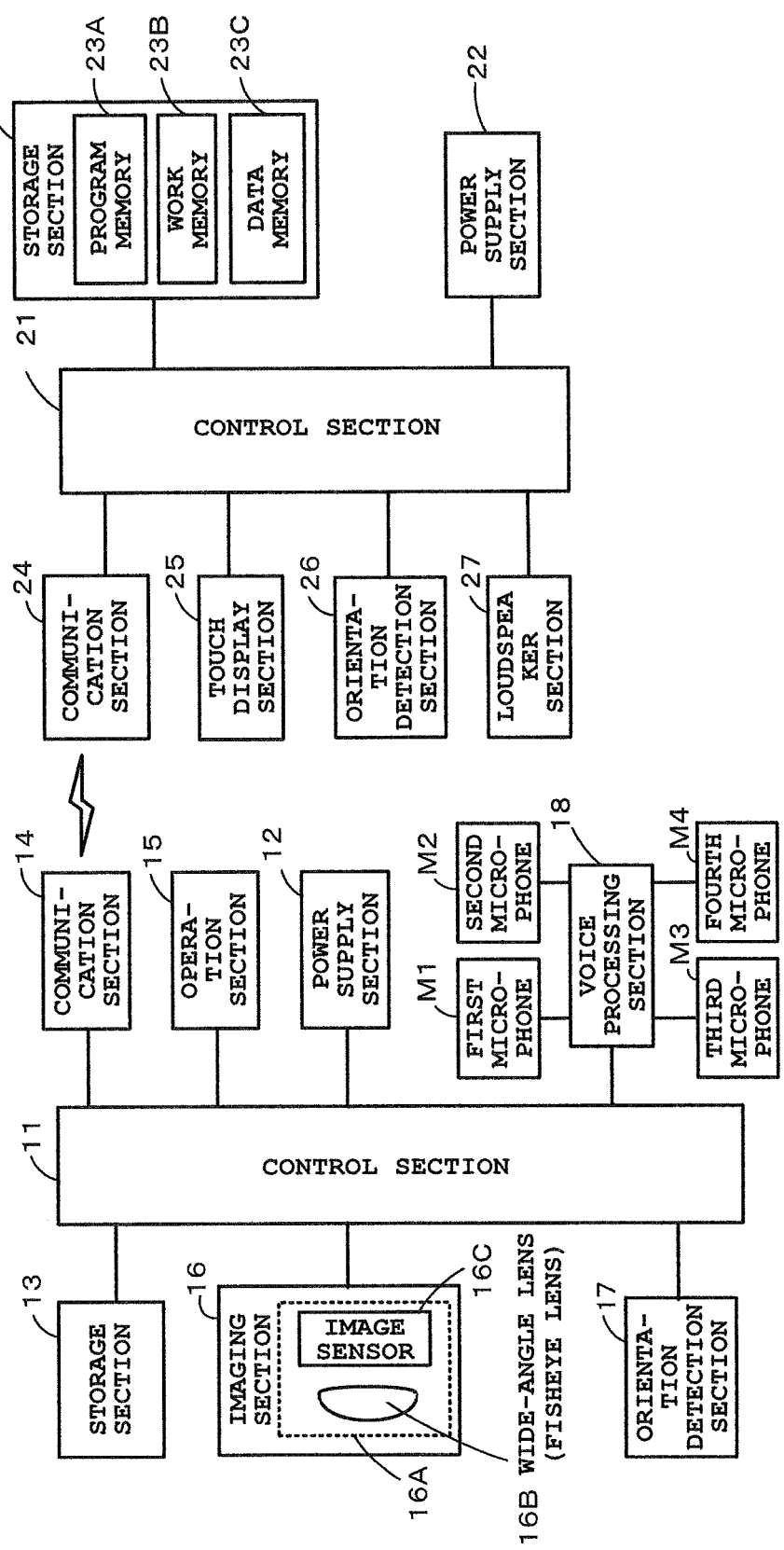

FIG. 11A

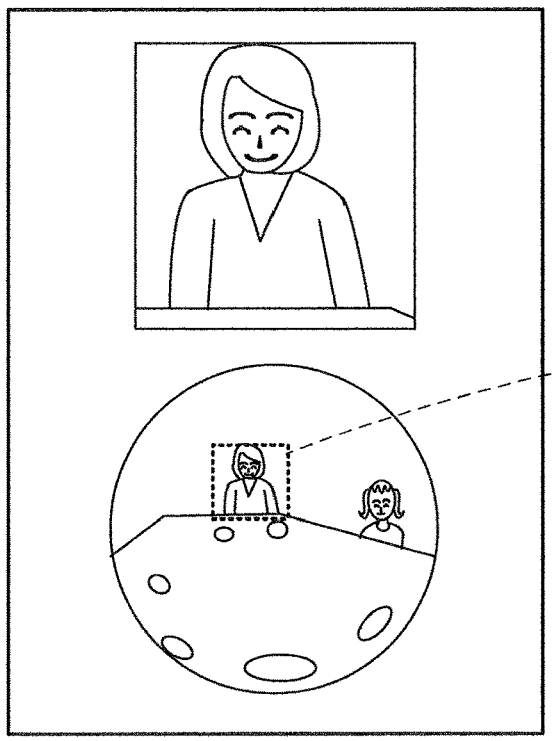

ENLARGE AND DISPLAY IMAGE
(IMAGE INCLUDING MOTHER)
OF CLIPPING AREA

SELECT FIRST TO FOURTH
MICROPHONES AND OUTPUT
MIXED VOICES COMING
FROM THESE MICROPHONES

PARTIAL AREA
(CLIPPING AREA)

INITIALLY SPECIFY
PREDETERMINED CENTER
PORTION OF FISHEYE IMAGE
AS CLIPPING AREA IN CASE
OF HORIZONTAL ORIENTATION

FIG. 11B

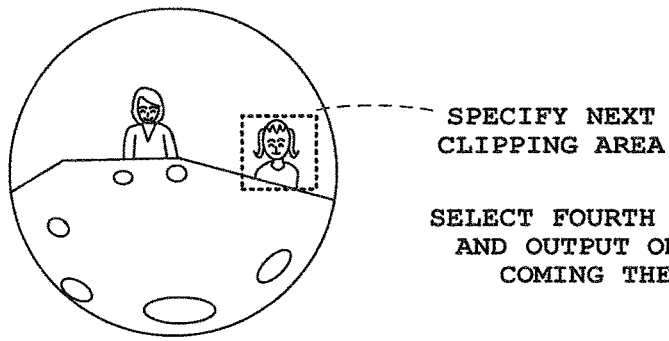

SPECIFY NEXT
CLIPPING AREA

SELECT FOURTH MICROPHONE
AND OUTPUT ONLY VOICE
COMING THEREFROM

FIG. 11C

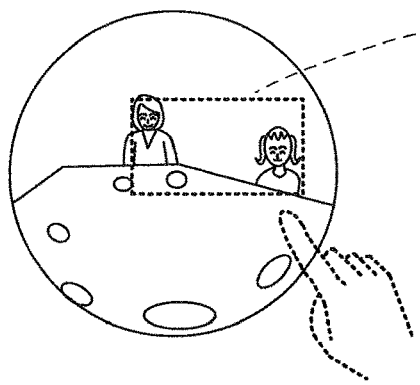

SPECIFY ARBITRARY
CLIPPING AREA
BY USER OPERATION

SELECT FIRST AND FOURTH
MICROPHONES AND OUTPUT
MIXED VOICES COMING
FROM THESE MICROPHONES

FIG. 12A

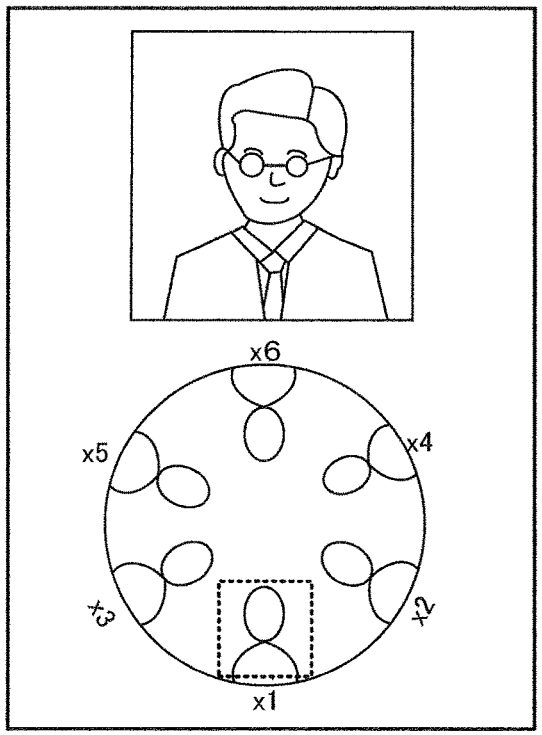

ENLARGE AND DISPLAY IMAGE (IMAGE INCLUDING PERSON x1) IN CLIPPING AREA

SELECT THIRD MICROPHONE AND OUTPUT ONLY VOICE COMING FROM THIS MICROPHONE

INITIALLY SPECIFY PREDETERMINED PERIPHERAL PORTION OF FISHEYE MOVING IMAGE AS CLIPPING AREA IN CASE OF HORIZONTAL ORIENTATION

FIG. 12B

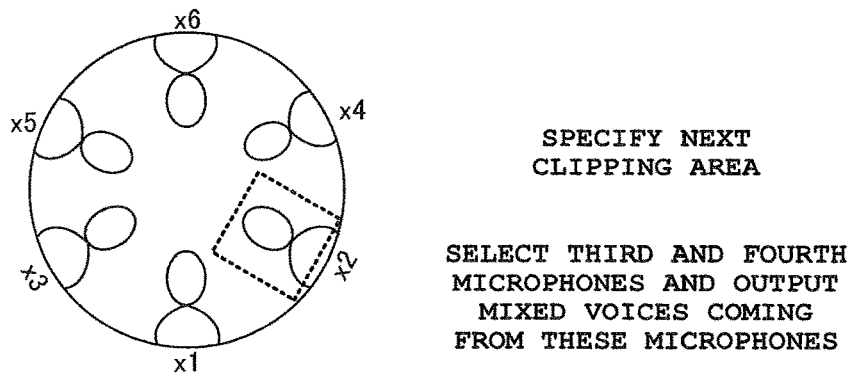

SPECIFY NEXT CLIPPING AREA

SELECT THIRD AND FOURTH MICROPHONES AND OUTPUT MIXED VOICES COMING FROM THESE MICROPHONES

FIG. 12C

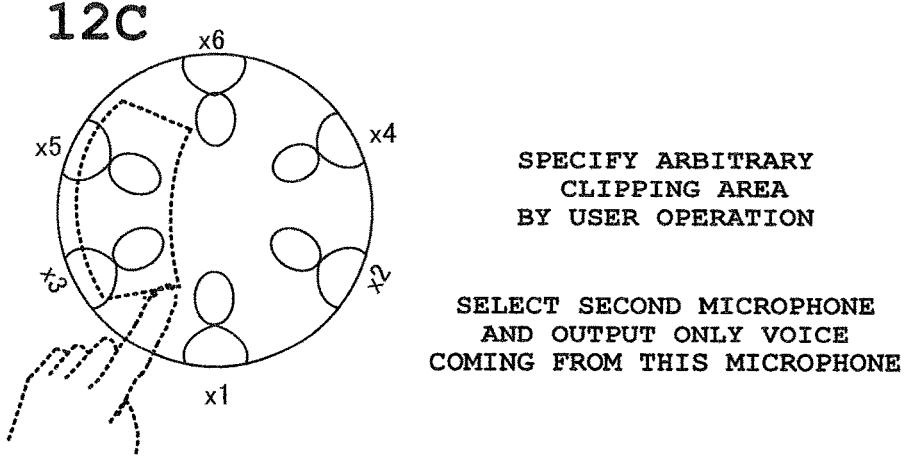

SPECIFY ARBITRARY CLIPPING AREA BY USER OPERATION

SELECT SECOND MICROPHONE AND OUTPUT ONLY VOICE COMING FROM THIS MICROPHONE

IMAGE PROCESSING DEVICE, IMAGE PROCESSING METHOD AND STORAGE MEDIUM CORRECTING DISTORTION IN WIDE ANGLE IMAGING

CROSS-REFERENCE TO RELATED APPLICATION

This application is based upon and claims the benefit of priority from the prior Japanese Patent Application No. 2017-186627 filed Sep. 27, 2017, the entire contents of which are incorporated herein by reference.

BACKGROUND OF THE INVENTION

1. Field of the Invention

The present invention relates to an image processing device, an image processing method and a storage medium for processing images with voices.

2. Description of the Related Art

In general, the use of a wide-angle lens (fisheye lens) allows wide-range image capturing at a viewing angle of, for example, substantially 180 degrees. As a technique using a fisheye image captured by this fisheye lens, a technique has been disclosed in which, from a distorted circular image (fisheye image) captured during a meeting and showing the faces of participants, the face of each participant is recognized, and an image (partial image) of each participant is clipped and displayed together with information regarding his or her speech time (refer to Japanese Patent Application Laid-Open (Kokai) Publication No. 2015-019162). In this technique, the face of each participant is recognized, an image of his or her face area is clipped, and an image (human face image) in the clipped area is displayed. Also, from changes (in luminance and color) near the lip of the participant, the speech status is recognized, and his or her speech time is judged.

SUMMARY OF THE INVENTION

In accordance with one embodiment, there is provided an image processing device comprising: a memory; and a CPU, wherein the CPU performs, based on a program stored in the memory, processing including: acquiring at least one image; acquiring voices corresponding to the image; specifying a partial area in an entire area of the acquired image; clipping the specified partial area from the image; and acquiring a voice corresponding to an image of the clipped partial area from all the acquired voices.

In accordance with another embodiment, there is provided an image processing method for an image processing device, comprising: acquiring at least one image; acquiring voices corresponding to the image; specifying a partial area in an entire area of the acquired image; clipping the partial area from the image; and acquiring a voice corresponding to an image of the clipped partial area from all the acquired voices.

In accordance with another embodiment, there is provided a non-transitory computer-readable storage medium having stored thereon a program that is executable by a computer in an image processing device to actualize functions comprising: acquiring at least one image; acquiring voices corresponding to the image; specifying a partial area in an entire area of the acquired image; clipping the partial area from the image; and acquiring a voice corresponding to an image of the clipped partial area from all the acquired voices.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1A and FIG. 1B are external views of a separate-type digital camera, of which FIG. 1A is a diagram showing a state where an imaging device 10 and a main body device 20 have been integrally combined and FIG. 1B is a diagram showing a state where the imaging device 10 and the main body device 20 have been separated;

FIG. 2A is a block diagram showing the structure of the imaging device 10 and FIG. 2B is a block diagram showing the structure of the main body device 20;

FIG. 11A to FIG. 11C are diagrams exemplarily showing a case in which a moving image (fisheye image) captured in a vertical orientation is displayed on a replay screen (portrait screen);

FIG. 12A to FIG. 12C are diagrams exemplarily showing a case in which a moving image (fisheye image) captured in a horizontal orientation is displayed on a replay screen (portrait screen)

DETAILED DESCRIPTION OF THE PREFERRED EMBODIMENTS

Embodiments of the present invention will hereinafter be described with reference to FIG. 1A to FIG. 12C.

Figure 1A:
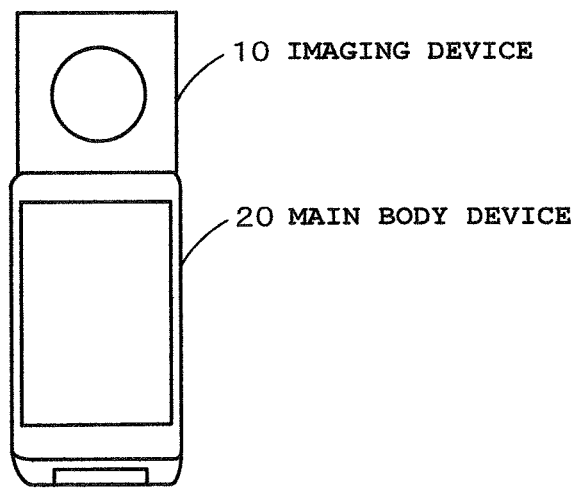
Figure 1B:
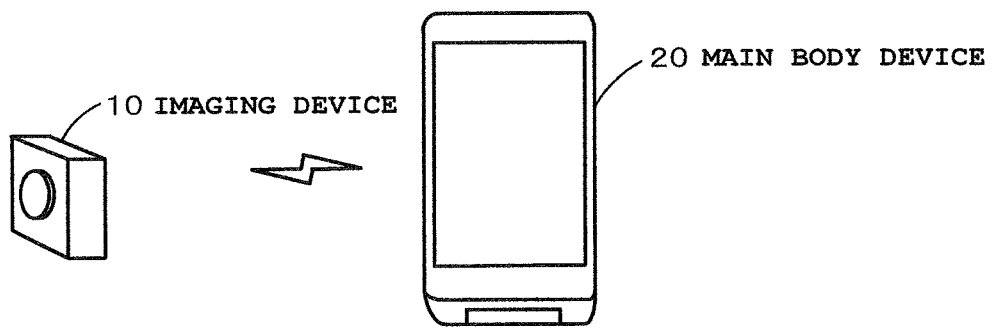

An embodiment of the present invention relates to a digital camera where an image processing device according to the present invention has been applied. This digital camera is a separate-type digital camera which can be separated into an imaging device 10 including an imaging section described further below and a main body device 20 including a display section described further below. FIG. 1A shows a state in which the imaging device 10 and the main body device 20 have been integrally combined, and FIG. 1B shows a state in which the imaging device 10 and the main body device 20 have been separated. Pairing (wireless connection recognition) between the imaging device 10 and the main body device 20 constituting this separate-type digital camera can be achieved by using wireless communication usable for each device. As wireless communication, wireless LAN (Wi-Fi) or Bluetooth (registered trademark) is used. The main body device 20 receives images captured on the imaging device 10 side and displays the received images (live view image) on a monitor screen (live view screen).

FIG. 2A is a block diagram showing the structure of the imaging device 10, and FIG. 2B is a block diagram showing the structure of the main body device 20.

In FIG. 2A, the imaging device 10 includes a control section 11, a power supply section 12, a storage section 13, a communication section 14, an operation section 15, an imaging section 16, an orientation detection section 17, a voice processing section 18, and four microphones M1, M2, M3 and M4. The control section 11 is operated by power supply from the power supply section (secondary battery) 12 and controls the entire operation of this imaging device 10 in response to various programs in the storage section 13. This control section 11 is provided with a CPU (Central Processing Unit), a memory, and the like not shown. The storage section 13 is constituted by, for example, a ROM (Read Only Memory), a flash memory, or the like. In the storage section 13, programs and various applications for achieving the present embodiment are stored. The communication section 14 is a communication interface which transmits captured images and the like to the main body device 20 side or receives operation instruction signals and the like from the main body device 20. The operation section 15 includes basic operation keys (hardware keys) such as a power supply switch.

The imaging section 16 constitutes a camera section which can capture still images or moving images of a subject with high definition. This imaging section 16 has a lens unit 16A provided with a wide-angle lens 16B, an image sensor 16C, and the like. This wide-angle lens 16B is a fisheye lens which can perform wide range imaging with a viewing angle of substantially 180 degrees, and captures a half-celestial-sphere image by using one wide-angle lens (hereinafter also referred to as a fisheye lens) in the present embodiment. Note that the entire area of a captured fisheye image (hemispherical image) is distorted and the distortion gradually becomes larger from its center (optical axis) toward a lens edge (peripheral portion).

When an image (optical image) of a subject is captured by this fisheye lens 16B and formed at the image sensor (such as a CMOS (Complementary Metal Oxide Semiconductor) or CCD (Charge Coupled Device)) 16C, an image signal (analog-value signal) acquired by photo-electrical conversion by this image sensor 16C is converted to a digital signal by an A/D converting section omitted in the drawing, and then transmitted to the main body device 20 side. On the main body device 20 side, the captured image is acquired, subjected to the processing of correcting distortion by the wide-angle lens 16B and the like, and then displayed as a frame of a live view image by monitor display. This distortion correction processing is a technique generally used in cameras, and this known technique is used in the present embodiment. Since it is a known technique, its specific description is omitted herein.

Figure 3A:
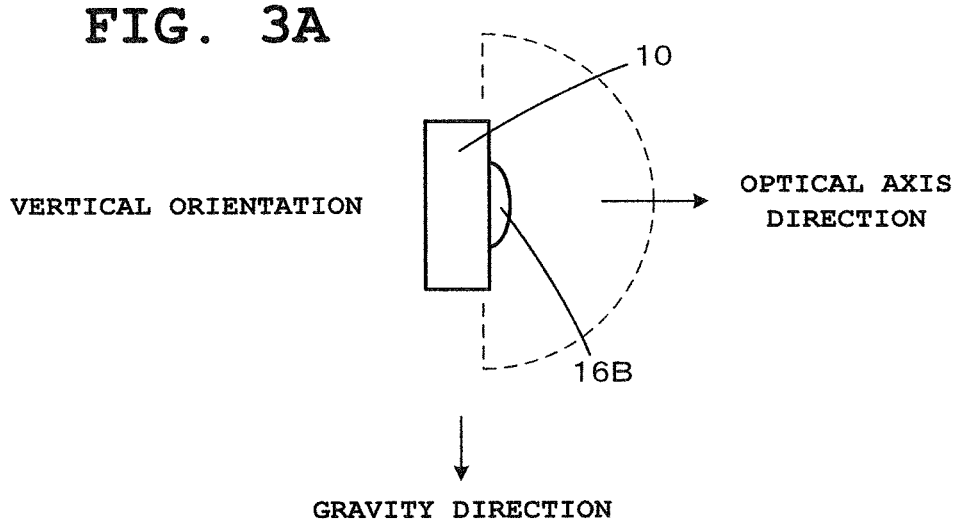
FIG. 3A to FIG. 3C are diagrams for describing the orientation of the imaging device 10 during image capturing.

The orientation detection section 17 has, for example, a triaxial acceleration sensor or gyro sensor which detects the orientation of the imaging device 10 in image capturing. The control section 11 detects an orientation (vertical orientation or horizontal orientation, which is an orientation at the time of image capturing) of the imaging device 10 based on a sensor signal from the orientation detection section 17. FIG. 3A shows an orientation (vertical orientation) when the optical axis direction of the fisheye lens 16B is substantially orthogonal to the gravity direction (vertical orientation state), that is, when the imaging device 10 captures images with it being substantially vertical to the ground. When the imaging device 10 is in this orientation, the orientation detection section 17 detects a vertical orientation as an orientation for image capturing.

Figure 3B:
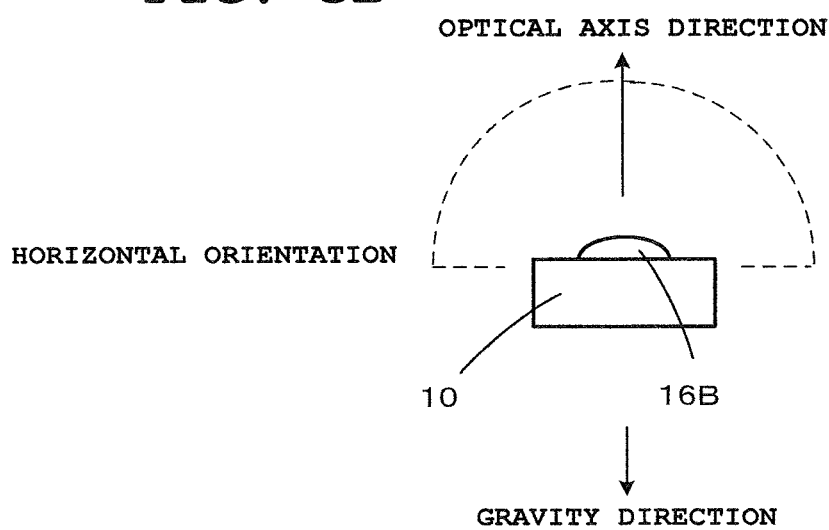

FIG. 3B shows an orientation of the imaging device 10 (horizontal orientation) when the optical axis direction of the fisheye lens 16B is oriented to the zenith (horizontal orientation state), that is, when the imaging device 10 captures images with the optical axis direction of the fisheye lens 16B being substantially opposite to the gravity direction. When the imaging device 10 is in this orientation, the orientation detection section 17 detects a horizontal orientation as an orientation for image capturing. Note that, in the drawings, each half celestial sphere indicated by a broken line represents the imaging range of the fisheye lens 16B having a viewing angle of substantially 180 degrees. Data indicating an orientation in image capturing which has been detected by this orientation detection section 17 is sent to the main body device 20. In moving image capturing, orientations sequentially detected during the image capturing are sequentially sent to the main body device 20.

Figure 3C:
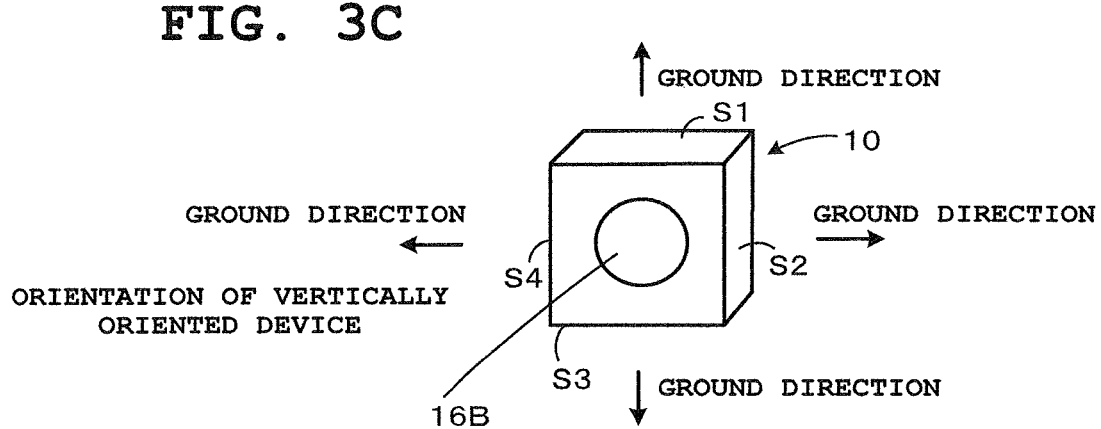

FIG. 3C shows the orientation of the imaging device 10 when it is vertically oriented such that any of its outer side surfaces S1, S2, S3 and S4 is opposed to the ground. Based on the detection result of the orientation detection section 17 at the time of image capturing, the control section 11 detects a vertical orientation or horizontal orientation as an orientation of the imaging device 10 or detects which direction the imaging device 10 is situated toward in the vertical orientation or horizontal orientation. Thus detected orientation information is stored in association with captured fisheye images when the captured fisheye images are stored as captured images, that is, when the captured fisheye images are subjected to predetermined image processing (such as development processing) and stored as captured images.

Figure 4:
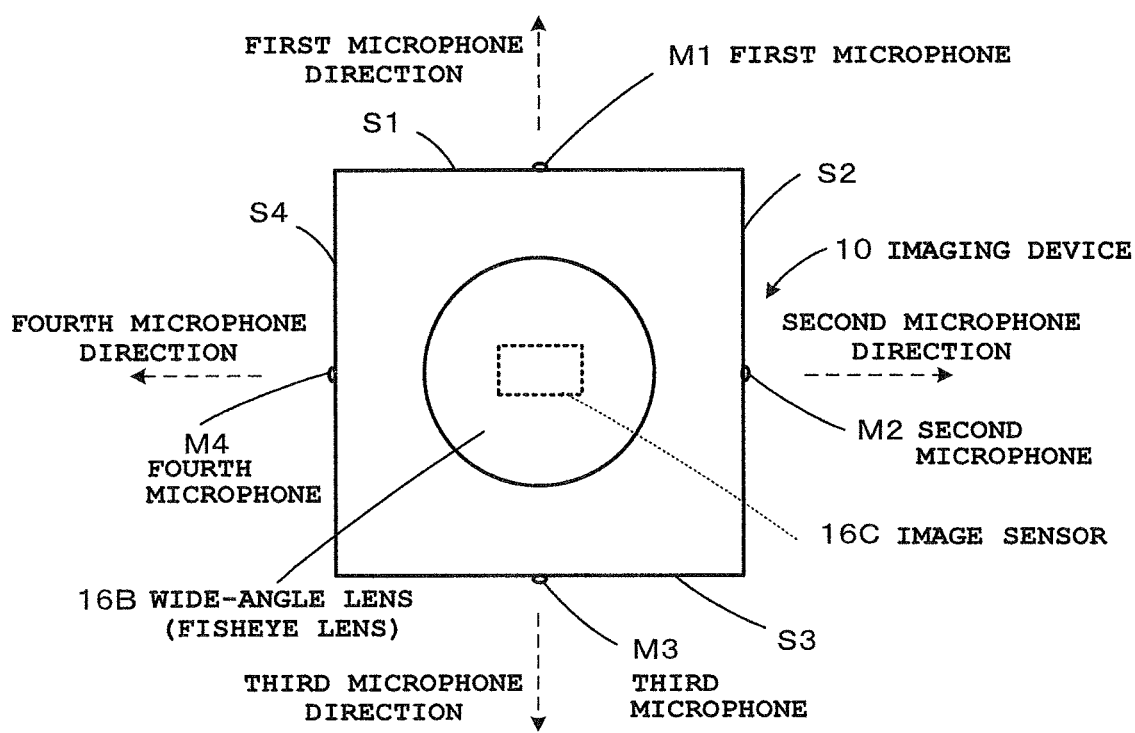
FIG. 4 is a diagram for describing a state where four microphones M1 to M4 have been arranged on the outer side surface of the imaging device 10.

The four microphones M1 to M4 are ultra-compact microphones which collect peripheral voices in synchronization with an operation of capturing a moving image, and most suitable for beamforming. For example, they are MEMS (Micro Electronics Mechanical System) microphones resistant to vibrations, shocks, and temperature changes and achieving excellent acoustic characteristics and electrical characteristics. Although non-directional microphones are used as the four microphones M1 to M4 in the present embodiment, they may be directional microphones. These four microphones M1 to M4 are arranged and fixed to outer side surfaces (four surfaces) of the imaging device 10, respectively, as shown in FIG. 4.

More specifically, the four microphones M1 to M4 are arranged at center portions on outer side surfaces S1 to S4 of the imaging device 10. The imaging device 10 is structured such that its housing forms a box shape (cube) as a whole and the fisheye lens 16B is arranged at a front center portion. In the drawing, the four microphones M1 to M4 are arranged on outer side surfaces of the housing. That is, the first microphone M1 is arranged and fixed onto the upper outer side surface (upper end face) S1 of the housing, the second microphone M2 is arranged and fixed onto the right outer side surface (right end face) S2 thereof, the third microphone M3 is arranged and fixed onto the lower outer side surface (lower end face) S3 thereof, and the fourth microphone M4 is arranged and fixed onto the left outer side surface (left end face) S4 thereof. The orientation of each microphone surface (microphone direction) is in an outer side direction of the housing.

By the microphones M1 to M4 being arranged in the imaging device 10 as described above, the position relation between the respective microphones M1 to M4 and the outer side surfaces S1 to S4 of the imaging device 10 is fixed and the position relation between the respective microphones M1 to M4 and the light-receiving surface of the image sensor 16C is fixed. Therefore, the relation between a side of an image captured by this image sensor 16C and the corresponding microphone is clarified. Voices sequentially collected by these microphones M1 to M4 in moving image capturing are sequentially sent to the main body device 20.

In FIG. 2B, the main body device 20 has a replay function of replaying captured images, and includes a control section 21, a power supply section 22, a storage section 23, a communication section 24, a touch display section 25, an orientation detection section 26, and a loudspeaker section 27. The control section 21 is operated by power supply from the power supply section 22 and controls the entire operation of this main body device 20 in response to various programs in the storage section 23. This control section 21 is provided with a CPU (Central Processing Unit), a memory, and the like not shown.

The storage section 23 includes a program memory 23A having stored thereon programs (FIG. 8 to FIG. 10) and various applications for achieving the present embodiment, a work memory 23B which temporarily stores various information (such as flags) required for this main body device 20 to operate, and a data memory 23C which stores image data, voice data, and the like. Note that the storage section 23 may be structured to include a removable portable memory (recording medium) such as an SD (Secure Digital Card) card or USB (Universal Serial Bus) memory. Also, although not shown, in a case where the main body device 20 is connected to a network via a communication function, the storage section 23 may be structured to include a storage area on a predetermined server device side.

The communication section 24 is a communication interface which transmits and receives various data to and from the imaging device 10. The touch display section 25 is structured by a touch panel being laminated on a display such as a high-definition liquid-crystal display, and a display screen (rectangular screen) having an uneven aspect ratio on the display serves as a monitor screen (live view screen) which displays captured live view image (fisheye image) on a real-time basis or a screen for replaying captured images. The orientation detection section 26 is a triaxial acceleration sensor or the like which detects acceleration applied to the main body device 20. This orientation detection section 26 detects, as the orientation of the main body device 20, whether the screen is a vertically-elongated screen (vertical orientation) or a horizontally-elongated screen (horizontal orientation) in accordance with the orientation of the screen of the touch display section 25, and provides the detection result to the control section 21. The loudspeaker section 27 is structured to replay and output voices collected by the microphones M1 to M4 of the imaging device 10 and the like, and includes one or plurality of loudspeakers.

Figure 5A:
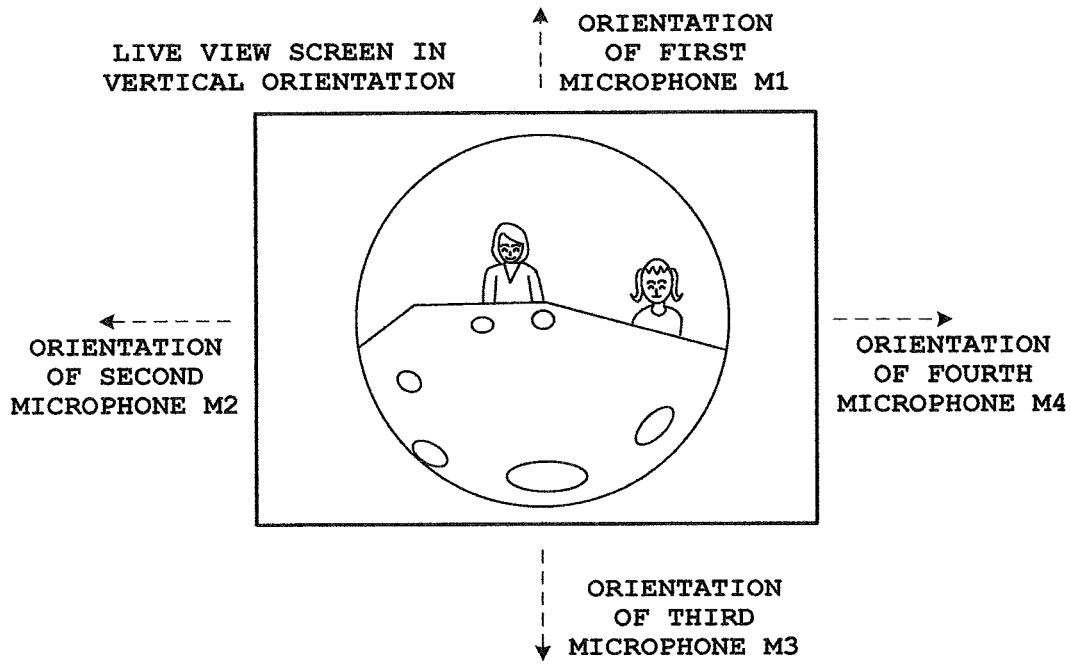
FIG. 5A and FIG. 5B are diagrams showing display examples of a live view screen showing a fisheye image captured by a fisheye lens 16B.
Figure 5B:
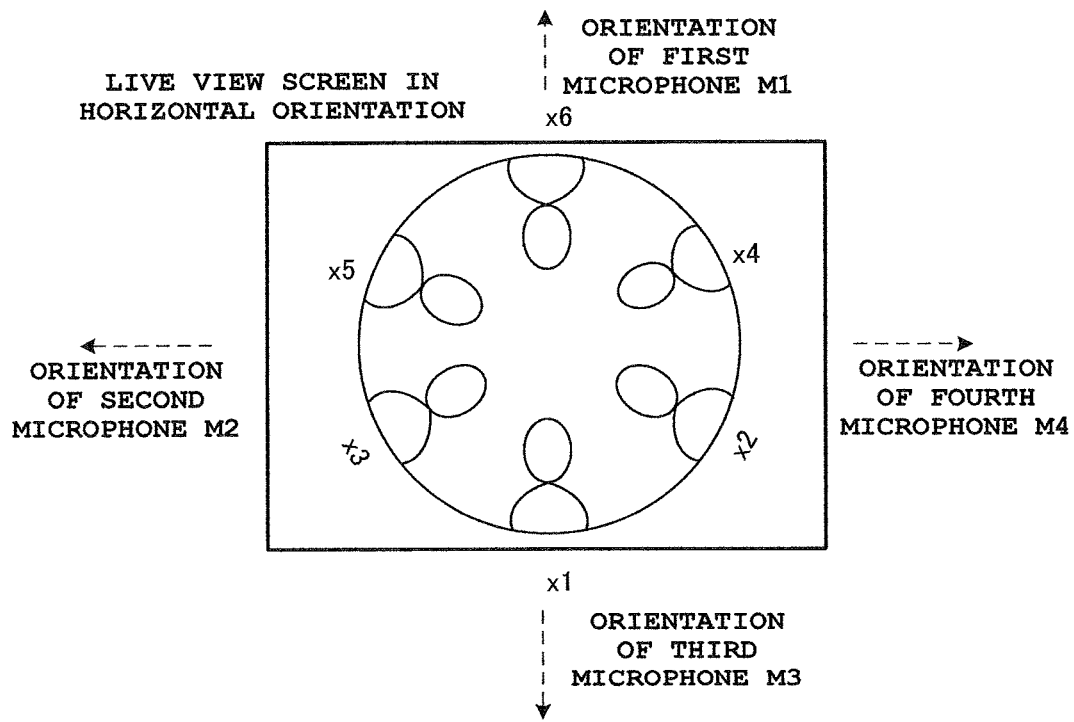

FIG. 5A and FIG. 5B are diagrams exemplarily showing fisheye images captured by the fisheye lens 16B.

FIG. 5A is a diagram exemplarily showing a relation between a live view screen and the orientations of the microphones M1 to M4 when a circular fisheye image acquired by photographing a parent and a child sitting at a table outdoors from the front (when an image of the parent and the child is captured in the horizontal orientation with the optical axis direction corresponding to a substantially horizontal direction) is being displayed on a horizontally-elongated screen (horizontal orientation). In this example, the upper side of the fisheye image corresponds to the orientation of the first microphone M1, the lower side thereof corresponds to the orientation of the second microphone M2, the left side thereof corresponds to the orientation of the third microphone M3, and the right side thereof corresponds to the orientation of the fourth microphone M4.

FIG. 5B is a diagram exemplarily showing a relation between a live view screen and the orientations of the microphones M1 to M4 when a circular fisheye image of participants (for examples, persons x1 to x6) in a meeting is captured (when an image of a scene of the meeting is captured in the horizontal direction with the optical axis direction corresponding to a substantially zenith direction) and displayed on a horizontally-elongated screen (horizontal orientation). The position relation between each of the microphones M1 to M4 and the fisheye image in this example is the same as that of FIG. 5A.

Figure 6:
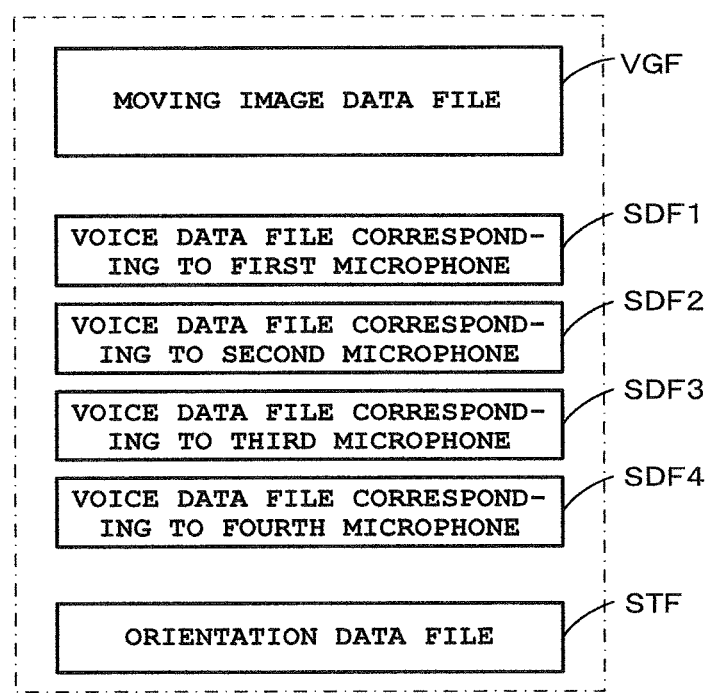
FIG. 6 is a diagram exemplarily showing the contents of a data memory 23C (such as a SD card) stored with moving image data acquired by an imaging device 10 and voice data collected thereby in association with each other.

FIG. 6 is a diagram exemplarily showing the contents of the data memory 23C (for example, SD card) stored with moving images captured by the imaging device 10 and voices collected thereby in association with each other. The data memory 23C is a memory which sequentially stores captured still images and moving images. FIG. 6 schematically shows a data structure when voice-attached moving images have been stored, that is, when moving images (fisheye images) have been captured and stored and voices have been collected and stored during the image capturing. In the present embodiment, in the data memory 23C, microphone-specific voice data files SDF1 to SDF4 and orientation data file STF have been stored in association with a moving-image data file VGF.

The moving-image data file VGF is a file for storing moving images (fisheye images) captured by the imaging device 10. In the following descriptions, moving images (fisheye images) are referred to as "fisheye moving images". The microphone-specific voice data files SDF1 to SDF4 are files for storing voices collected by the corresponding first microphone M1 to the fourth microphone M4 during the moving image capturing. The orientation data file STF is a file for storing data indicating orientations of the imaging device 10 during the image capturing of the fisheye moving images.

Figure 7:
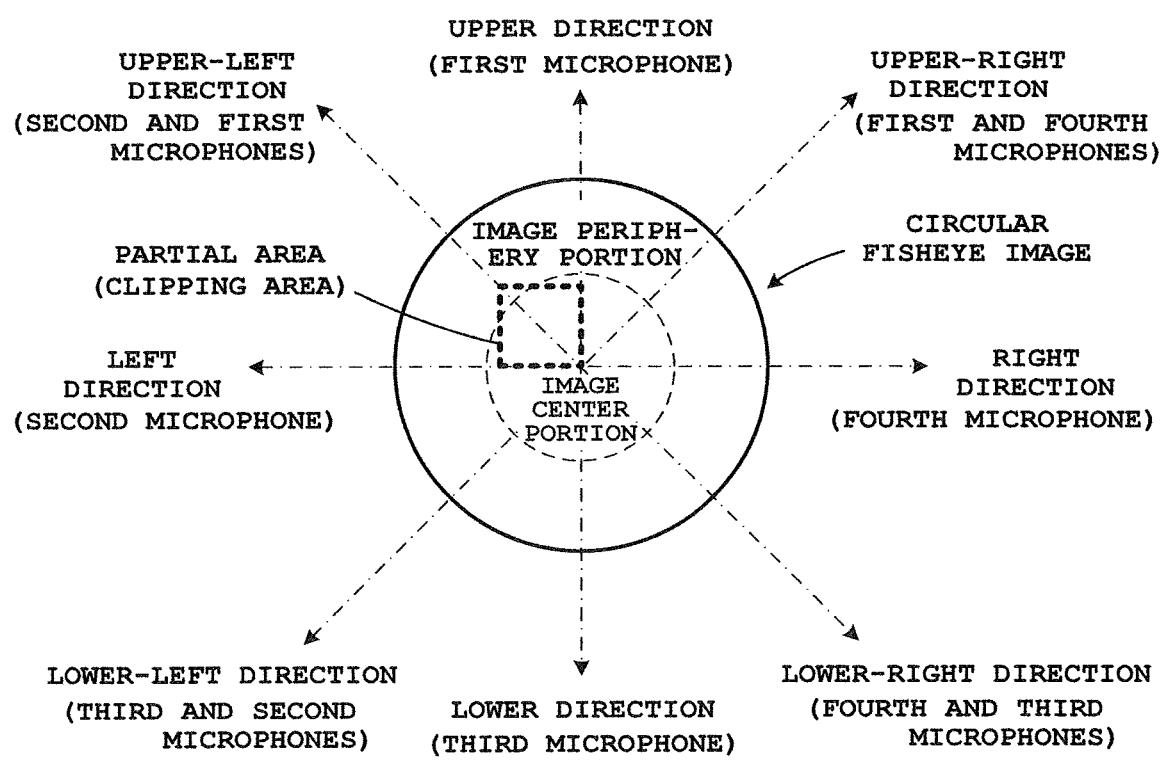
FIG. 7 is a diagram for describing a feature of the present embodiment when voice-attached fisheye moving images are replayed.

FIG. 7 is a diagram for describing a feature of the present embodiment when voice-attached fisheye moving images are replayed.

A quadrangular area (rectangular frame) indicated by a broken line in the drawing is a partial area on a plane of an entire fisheye moving image serving as a replay target. In the example of FIG. 7, a state is shown in which this partial area has been specified. This partial area on the plane is not a part on the time axis of the fisheye moving image but a partial area on a frame (on plane coordinates). The control section 21 clips an image in the specified partial area for each frame, and enlarges and sequentially displays the clipped images on the replay screen of the touch display section 25. That is, the control section 21 specifies a partial area on the planes of all images as a clipping target and replays each image of that area. In the following descriptions, this partial area is also referred to as a "clipping area", and the replay of images in this clipping area is referred to as "clipping replay".

Note that any of the following exemplary methods may be used to specify a partial area on the above-described plane. In one method, a subject such as a person is detected in a fisheye moving image by image analysis, and an area including the detected subject is automatically specified as a partial area. In another method, a plurality of areas including a subject are automatically detected by the above-described image analysis, and the user is prompted to select one of these areas via the touch display section 25 or the like. This allows a user-desired area on the fish moving image to be accurately specified.

When an instruction for this clipping replay is provided, the control section 21 acquires and replays voice data collected from a sound source in a direction corresponding to this partial area (clipping area). In the present embodiment, the control section 21 judges whether the specified partial area (clipping area) is located at an image center portion or an image peripheral portion in an entire image serving as a replay target. Here, the control section 21 judges that the clipping area is located at the image center portion when a substantially entire (for example, 80% or more) partial area is included in the image center portion as in the shown example. When the partial area is located at the image center portion, the control section 21 takes voices inputted from the four microphones M1 to M4 as voices from the direction corresponding to the clipping area, acquires voice data corresponding to the microphones M1 to M4, converts the voice data to a signal where these pieces of data have been mixed and adjusted, and outputs the resultant signal from the loudspeaker section 27.

On the other hand, when a substantially entire (for example, 80% or more) partial area is included in the image peripheral portion, the control section 21 judges in which of eight directions (four directions including upper, lower, left, and right directions and four directions including upper-right, lower-right, upper-left, and lower-left directions) the clipping area is substantially located, that is, judges to which direction the clipping area is biased. The control section 21 then selects a microphone corresponding to this judged direction (biased direction) from among the four microphones M1 to M4, acquires voice data from the voice data file corresponding to the selected microphone, and replays it. For example, in a case where the clipping area is substantially located in the upper direction, only the first microphone M1 corresponding to the upper end face S1 of the housing is selected and its voice data is replayed. In a case where the clipping area is substantially located in the upper-right direction, the first microphone M1 and the fourth microphone M4 corresponding to the upper end face S1 and the right-end face are selected, and voice data corresponding to these microphones are converted to a signal after mixing and adjustment and then replayed.

That is, the position relation between a microphone among the four microphones M1 to M4 and the corresponding side of each image captured by the image sensor 16C is obvious. Therefore, when the clipping area is located in the image peripheral portion, a microphone in the direction in which the clipping area is located is selected, and a voice corresponding to that microphone is replayed. As described above, in the present embodiment, a microphone for collecting a voice from a direction corresponding to a clipping area is selected, and its voice is replayed. In the following descriptions, this microphone for collecting a voice from a direction corresponding to a clipping area is referred to as a "microphone corresponding to a clipping area".

Figure 8:
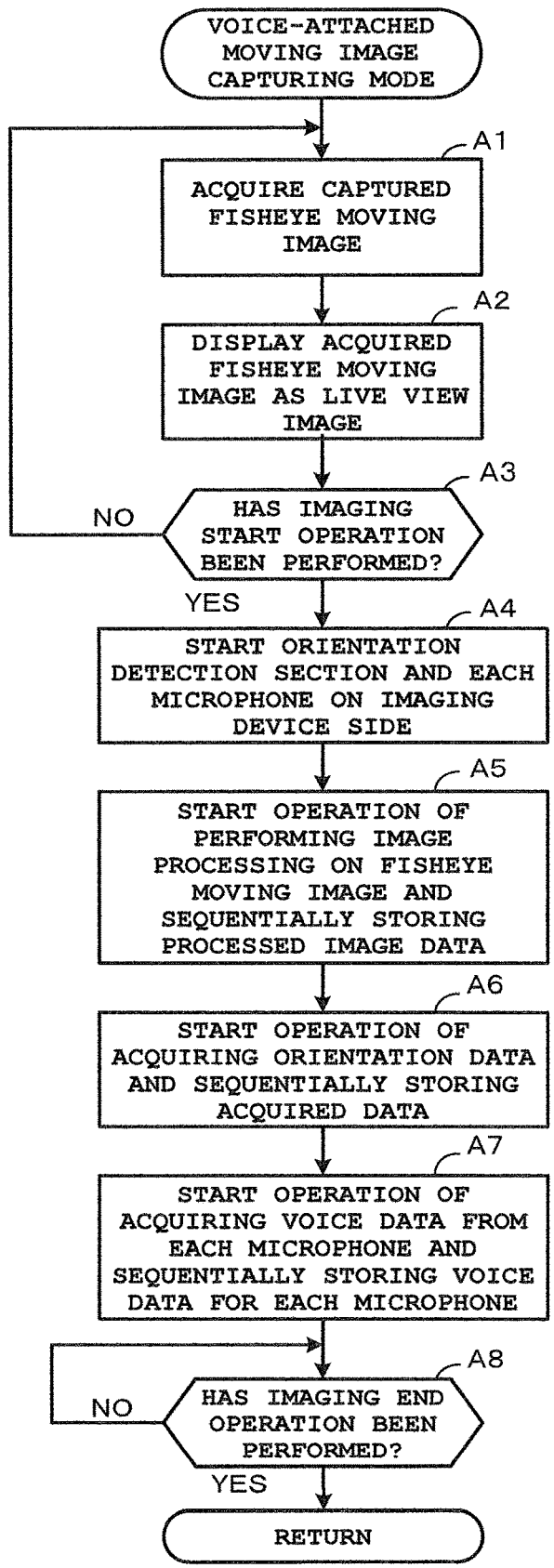
FIG. 8 is a flowchart of an operation (a characteristic operation in the present embodiment) in a moving imaging mode.
Figure 9:
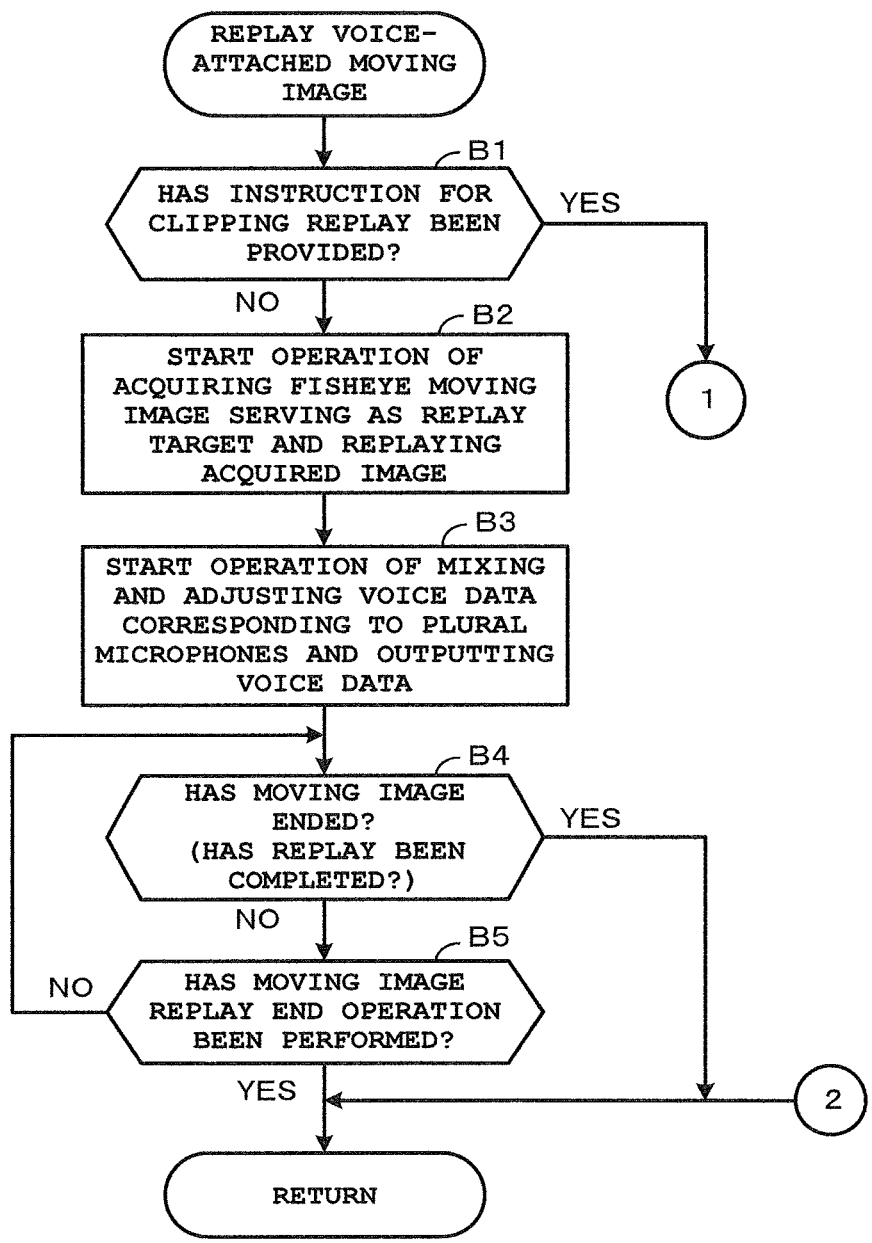
FIG. 9 is a flowchart of an operation (a characteristic operation in the present embodiment) to be started when an instruction for replaying voice-attached moving images is provided.
Figure 10:
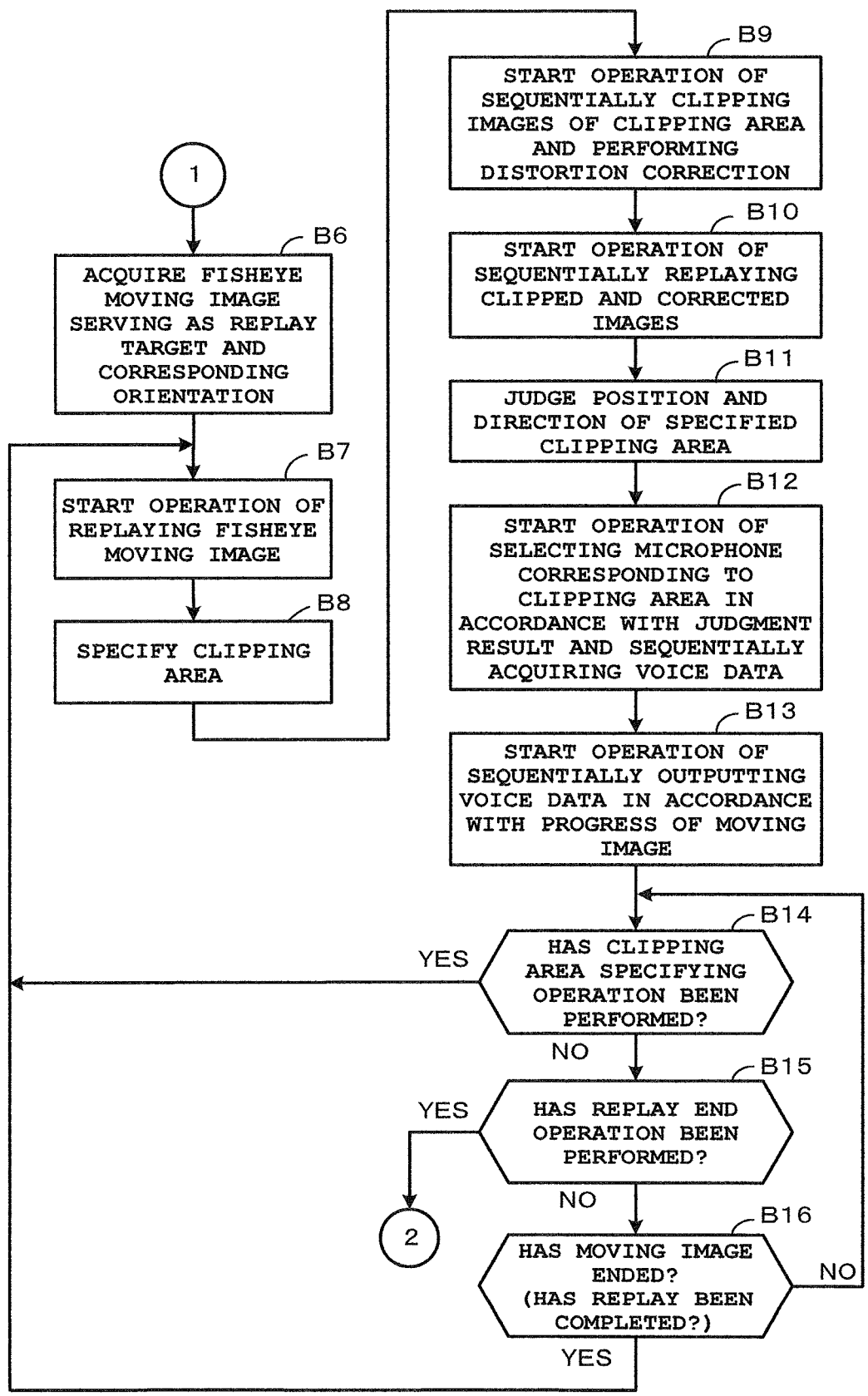
FIG. 10 is a flowchart of an operation following that shown in FIG. 9.

Next, a general outline of the operation of the image processing device (separate-type digital camera) in the present embodiment is described with reference to flowcharts shown in FIG. 8 to FIG. 10. Here, each function described in these flowcharts is stored in the storage section 23 (program memory 23A) of the main body device 20 in a readable program code format, and operations based on these program codes are sequentially performed. Also, in the present embodiment, operations based on the above-described program codes transmitted over a transmission medium such as a network can also be sequentially performed. That is, in the present embodiment, the unique operations of the present embodiment can be performed using programs and data supplied from an outside source over a transmission medium, in addition to a recording medium. FIG. 8 to FIG. 10 are flowcharts outlining the operation of the characteristic portion of the present embodiment from among all of the operations of the camera. After exiting the flows of FIG. 8 to FIG. 10, the control section 21 returns to the main flow (omitted in the drawings) of the overall operation.

FIG. 8 is a flowchart of an operation (characteristic operation in the present embodiment) in an imaging mode to which a current mode is switched when image capturing of a voice-attached fisheye moving image is performed.

First, the control section 21 on the main body device 20 side receives and acquires a fisheye moving image captured by the imaging device 10 (Step A1), and displays the acquired fisheye moving image on the touch display section 25 as a live view image (Step A2). During the display of this live view image, the control section 21 judges whether an instruction for starting image capturing of a fisheye moving image has been provided by a user operation (Step A3) and repeatedly returns to the processing of displaying the live view image on the touch display section 25 until an imaging start instruction is provided (Steps A1 and A2). When judged that an instruction for starting image capturing has been provided (YES at Step A3), the control section 21 instructs the imaging device 10 to start image capturing and thereby activates the orientation detection section 17 and the microphones M1 to M4 on the imaging device 10 side (Step A4).

In response to this imaging start instruction, while performing image processing on a fisheye moving image acquired from the imaging device 10, the control section 21 starts an operation of sequentially storing processed image data in the moving-image data file VGF (Step A5), and also starts an operation of acquiring orientation data indicating an orientation detected by the orientation detection section 17 and sequentially storing orientation data in the orientation data file STF (Step A6). Furthermore, the control section 21 starts an operation of acquiring voice data of voices inputted from the microphones M1 to M4 and sequentially storing voice data in the corresponding voice data files SDF1 to SDF4 (Step A7). During this image capturing of the fisheye moving image, the control section 21 judges whether an instruction for ending the image capturing has been provided by a user operation (Step A8), and waits until an imaging end instruction is provided. If an instruction for ending the image capturing has been provided (YES at Step A8), the control section 21 exits from the flow of FIG. 8.

FIG. 9 and FIG. 10 show a flowchart of an operation (characteristic operation in the present embodiment) to be started when an instruction for replaying a voice-attached moving image is provided.

After a current mode is switched to a moving-image replay mode, when a voice-attached moving image is selected as a replay target by a user operation and an instruction for replaying the voice-attached moving images is provided, the control section 21 on the main body device 20 side proceeds to the flow of FIG. 9, and judges whether an instruction to perform the above-described clipping replay has been provided by a user operation (Step B1 of FIG. 9).

When judged that no instruction has been provided for clipping replay (NO at Step B1), the control section 21 starts an operation of acquiring a fisheye moving image from the moving-image data file VGF and displaying the acquired image on the replay screen (Step B2), and starts an operation of acquiring voice data from the respective voice data files SDF1 to SDF4, converting the data to a voice signal where these pieces of data have been mixed and adjusted, and outputting the voice signal from the loudspeaker section 27 (Step B3). Here, by the voices inputted from the plurality of microphones M1 to M4 being mixed and then outputted, realistic voices can be acquired. During this replay of the voice-attached moving image, the control section 21 judges whether the moving image has ended (whether the replay has been completed) (Step B4) and whether an instruction for ending the replay of the moving image has been provided by a user operation (Step B5). Then, when judged that the moving image has ended (the replay has been completed) (YES at Step B4) or an instruction for ending the replay has been provided by the user (YES at Step B5), the control section 21 exits from this flow of FIG. 9.

At Step B1, when judged that an instruction to perform clipping replay has been provided (YES at Step B1), the control section 21 proceeds to the flow of FIG. 10, acquires fisheye moving image data as a replay target from the moving-image data file VGF, and acquires orientation data stored during the image capturing, from the corresponding orientation data file STF (Step B6). The control section 21 then starts an operation of displaying the entire area of the acquired fisheye moving image on the touch screen of the touch display section 25 (Step B7). In addition, with reference to the acquired orientation data stored during the image capturing, the control section 21 judges whether the image capturing has been performed in the horizontal orientation or in the vertical orientation and, in accordance with this judgment result, specifies a partial area on the fisheye moving image as a clipping area for guide display on the fisheye moving image (Step B8).

FIG. 11A is a diagram showing a state where a fisheye moving image (refer to FIG. 5A) captured in the vertical orientation has been displayed on the replay screen. In this shown example, a circular fisheye moving image has been displayed in a lower-half area of the replay screen (vertically-elongated screen). In the case of this fisheye moving image captured in the vertical orientation, an area including a person at an image center portion is specified as a clipping area for guide display. That is, in the present embodiment, the control section 21 prioritizes an area located at an image center portion and including a person or, in a case where a plurality of persons are at the image center portion, an area including a person whose image is the largest, and specifies this area as a clipping area for guide display (rectangular-frame display) above the fisheye moving image.

FIG. 12A is a diagram showing a state where a fisheye moving image captured in the horizontal orientation has been displayed on the replay screen. In this shown example, a circular fisheye moving image has been displayed in a lower-half area of the replay screen (vertically-elongated screen). In the case where this fisheye moving image captured in the horizontal orientation is displayed, the control section 21 prioritizes an area located at an image peripheral portion and including a person, and specifies this area as a clipping area. When a plurality of persons are at the image peripheral portion, the control section 21 prioritizes an area including a person with high priority based on the seating order as a clipping area for guide display (rectangular-frame display) above the fisheye moving image.

Note that the clipping area specifying method is not limited to the above-described method where a partial area on a fisheye moving image is specified as a clipping area in accordance with orientation data stored during the image capturing. For example, a method may be used in which an image clipping area is specified based on the position of a subject on a fisheye moving image which has been detected by image analysis being performed on the fisheye moving image.

Then, the control section 21 starts an operation of performing distortion correction while clipping an image of the specified clipping area for each frame (Step B9), and starts an operation of enlarging the clipped images subjected to the correction and sequentially displaying them on the replay screen of the touch display section 25 (Step B10). FIG. 11A and FIG. 12A each show a state where a clipped image (an image of the face of a person) subjected to distortion correction has been enlarged and displayed in an upper-half area of the replay screen (vertically-elongated screen). By the above-described operation, the entire area of the fisheye moving image and the clipped image (the image of the face of the person) have been concurrently displayed in the vertical direction on the replay screen. Note that a configuration may be adopted in which, if a person in a clipping area moves when an image of the clipping area is clipped for each frame, the clipping area is moved along with the movement of the person.

Next, the control section 21 judges whether the specified clipping area is at a center portion of the fisheye image or at a peripheral portion thereof and, when the clipping area is at the image peripheral portion, further judges its direction (biased direction) (Step B11). Here, if a substantially entire clipping area is included in the image center portion, the control section 21 judges that the clipping area is at the image center portion. If a substantially entire clipping area is included in the image peripheral portion, the control section 21 judges that the clipping area is at the image peripheral portion and further judges in which direction among the eight directions the clipping area is substantially positioned.

Then, the control section 21 starts an operation of selecting, from among the four microphones M1 to M4, a microphone corresponding to the clipping area in accordance with the judgment result at Step B11 and sequentially acquiring its voice data (Step B12), and starts an operation of sequentially outputting the acquired voice data from the loudspeaker section 27 in accordance with the progress of the image replay operation (Step B13). That is, from the position relation between the microphones M1 to M4 and the light-receiving surface of the image sensor 16C described above, that is, the position relation between the microphones M1 to M4 and the clipping area, the control section 21 selects a microphone corresponding to the clipping area and, while acquiring its voice data, sequentially outputs them from the loudspeaker section 27 in accordance with the progress of the image replay operation.

For example, when the specified clipping area is at the image center portion as shown in FIG. 11A, the control section 21 takes voices inputted from all the microphones M1 to M4 as voices from the direction corresponding to this clipping area, acquires voice data from the corresponding voice data files SDF1 to SDF4, converts the voice data to a signal where these pieces of data have been mixed and adjusted and outputs the resultant signal from the loudspeaker section 27. Also, when the specified clipping area is in the lower direction of the image peripheral portion as shown in FIG. 12A, the control section 21 takes a voice inputted from the third microphone M3 from among the microphones M1 to M4 as a voice from a direction corresponding to this clipping area, acquires voice data from the corresponding voice data file SDF3, and outputs only its voice from the loudspeaker section 27.

During the replay of this voice-attached fisheye image, the control section 21 judges whether a user operation for specifying an arbitrary clipping area has been performed (Step B14), judges whether an instruction for ending the replay has been provided by a user operation (Step B15), judges whether the moving image being replayed have ended (whether replay has been completed) (Step B16). When the moving image being replayed has ended (YES at Step B15), the control section 21 returns to the above-described Step B7, and repeats the above-described operations. As a result, the control section 21 again starts the replay of the fisheye moving image, specifies a clipping area with next priority in accordance with the orientation at the time of the image capturing, and displays the clipping area on the fisheye moving image by guide display.

For example, FIG. 11B is a diagram showing a state where an area including a person (child) shown in the image peripheral portion has been specified as a next clipping area. As a microphone corresponding to this clipping area, the fourth microphone M4 is selected. The control section 21 acquires a voice from this microphone M4 from the corresponding voice data file SDF4 as a voice from a direction corresponding to this clipping area, and replays only this voice. FIG. 12B is a diagram showing a state where an area including a person (x2) shown in the image peripheral portion with the next order has been specified as a next clipping area. Here, the fourth and third microphones M4 and M3 are selected. The control section takes voices inputted from these fourth and third microphones M4 and M3 as voices from a direction corresponding to this clipping area, acquires voice data from the corresponding voice data files SDF4 and SDF3, converts the voice data to a signal where the data have been mixed and adjusted, and replays the resultant signal by the loudspeaker section 27.

At Step B14, when judged that an arbitrary clipping area has been specified by the user via a touch operation (such as a slide operation) on the replay screen (touch screen) (YES at Step B14), the control section 21 returns to the above-described Step B7 to starts the replay of the fisheye moving image again. Then, the control section 21 specifies the arbitrarily specified area as a clipping area for guide display above the fisheye moving image (Step B8). For example, FIG. 11C is a diagram showing a state where an area including a parent and a child has been specified as a clipping area. FIG. 12C is a diagram showing a state where an area including adjacent persons x3 and x5 has been specified as a clipping area.

Then, the above-described operations are repeated (Step B9 to B13). Here, in FIG. 11C, since the clipping area is located across the image center portion and the image peripheral portion, the control section 21 judges that the clipping area is at the peripheral portion and the direction of the clipping area is an upper-right direction. As a result, the first microphone M1 and the fourth microphone M4 are selected, and a mixed voice from these microphones are replayed and outputted. In FIG. 12C, since the direction of the clipping area is a left direction, the second microphone M2 is selected, and a voice only from that microphone is outputted. At Step B15, when judged that an instruction for ending the replay has been provided by a user operation (YES at Step B15), the control section 21 exits from the flow of FIG. 9 and FIG. 10.

As described above, in the present embodiment, after images and corresponding voices are acquired, a partial area on the plane of the entire area of each image is specified and, from among all the acquired voices, a voice corresponding to the specified partial area is acquired and outputted. As a result of this configuration, the relation between a partial area on an image and a voice corresponding to the area is clarified when they are provided to the user.

Also, the control section 21 on the main body device 20 side selects a microphone that collects a voice from a partial area on an image and takes, from among all voices inputted from the plurality of microphones M1 to M4, a voice inputted from that microphone as a voice from a direction corresponding to that area. As a result of this configuration, an intended voice can be acquired only by a microphone being selected.

Moreover, the control section 21 acquires a captured and stored image as a replay target, and acquires voices collected and stored in synchronization with the capturing and storage of the image as a replay target. As a result of this configuration, in the replay of a voice-attached image, the relation between a partial area on the image and a voice from a direction corresponding thereto is clarified.

Furthermore, images to be captured and stored herein are fisheye images (half-celestial-sphere images) captured by using the fisheye lens 16B, and voices to be collected and stored during the image capturing are those inputted from the plurality of microphones M1 to M4 arranged in different areas around the fisheye lens 16B. Therefore, the correspondence between the images and the microphones is clarified. Also, by the plurality of microphones M1 to M4, the entire half-celestial-sphere imaging range can be set as a voice-collectable range.

Still further, when there are two or more microphones (microphones corresponding to a clipping area) that collect a voice corresponding to a partial area (clipping area) among all voices to be collected and stored for each of the plurality of microphones, the control section 21 selects these two or more microphones and combines voices from these microphones so as to acquire voices from a direction corresponding to that area. As a result of this configuration, there is no need to set a large number of microphones, and a wide range can be set as a voice-collecting target by a small number of microphones.

Still further, the control section 21 acquires the orientation of the imaging device 10 at the time of image capturing, and specifies a partial area on the plane of an image in accordance with this orientation. For example, when the imaging device 10 is in the vertical orientation, a partial area at an image center portion is specified. When the imaging device 10 is in the horizontal orientation, a partial area at an image peripheral portion is specified. As a result of this configuration, an appropriate area suitable for the orientation of the imaging device 10 can be specified.

Yet still further, the control section 21 specifies a clipping area arbitrarily specified by a user operation as a partial area in the entire area of an acquired image. As a result of this configuration, a user-intended area can be specified.

Yet still further, the control section 21 displays an image of a specified partial area on the replay screen with an acquired image being displayed. As a result of this configuration, the relation between the entire area of an image and its partial portion is clarified to the user.

Yet still further, when displaying an image of a partial area on a fisheye image, the control section 21 displays an image subjected to distortion correction. As a result of this configuration, the user can view images without distortion.

Yet still further, the control section 21 displays an image of a specified partial area and outputs a voice corresponding thereto. As a result of this configuration, the user can view images without distortion, the correspondence between an image and a voice is clarified.

First Modification Example

In the above-described embodiment, the four microphones M1 to M4 are arranged at center portions of the outer side surfaces S1 to S4 of the imaging device 10 so as to be placed in different directions. However, the arrangement state of the plurality of microphones is not limited thereto.

Figure 13A:
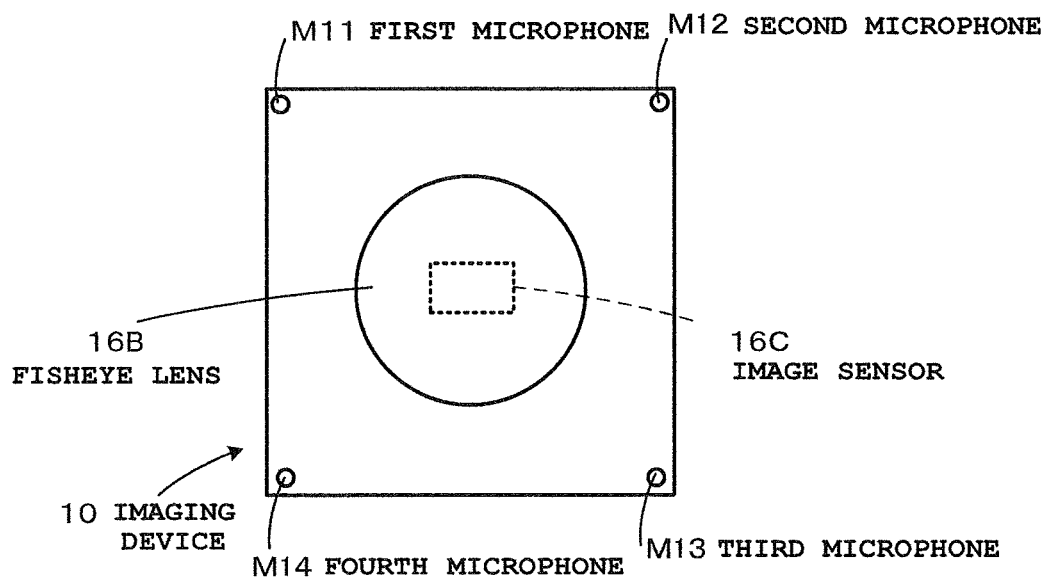
FIG. 13A and FIG. 13B are diagrams for describing other arrangement states of a plurality of microphones as modification examples of the present embodiment.

FIG. 13A is a diagram showing a state where four microphones M11 to M14 have been arranged in a quadrangular shape on the front (surface on the fisheye lens 16B side) of the imaging device 10. That is, on the front of the imaging device 10, the first microphone M11 has been arranged at a upper-left corner, the second microphone M12 has been arranged at an upper-right corner, the third microphone M13 has been arranged at a lower-left corner, and the fourth microphone M14 has been arranged at a lower-right corner. The microphone surfaces (voice-collecting directions) of these microphones M11 to M14 are all in the same direction (optical axis direction). As described above, the plurality of microphones may be oriented to the same direction. Also, the number of the plurality of microphones is not limited to four and may be increased. It is only required that at least three microphones are arranged. By an arbitrary arrangement state of the plurality of microphones being allowed, implementation flexibility can be enhanced.

Second Modification Example

In the above-described embodiment, the four microphones M1 to M4 are two-dimensionally arranged. However, these microphones may be three-dimensionally arranged.

Figure 13B:
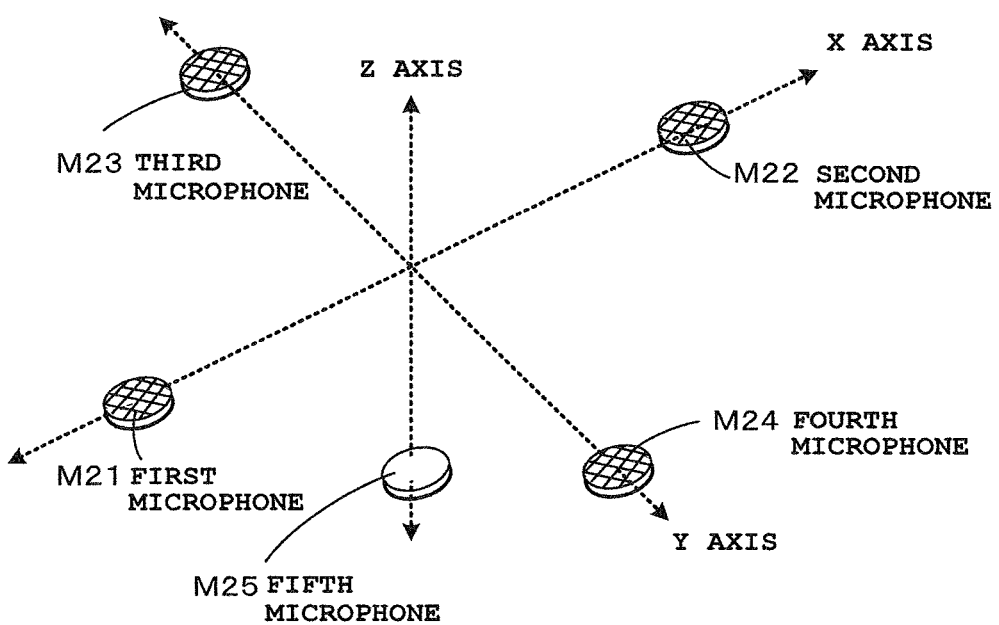

FIG. 13B is a diagram showing an example where five microphones have been three-dimensionally arranged. In the shown example, as with the case of FIG. 13A, a first microphone M21 to a fourth microphone M24 have been arranged on the front (the surface on the fisheye lens 16B side) of the imaging device 10, but a fifth microphone M25 has been arranged at a front center portion of the imaging device 10. That is, the first microphone M21 and the second microphone M22 have been arranged on the minus side and the plus side of the X axis, the third microphone M23 and the fourth microphone M24 have been arranged on the minus side and the plus side of the Y axis, and the fifth microphone M25 has been arranged on the minus side of the Z axis. By the plurality of microphones being three-dimensionally arranged, voices inputted from the respective microphones are mixed and outputted. Therefore, more realistic voices can be acquired. Also, even a voice from a sound source opposite to (at the back of) the optical axis direction can be collected and outputted.

Third Modification Example

In the above-described embodiment, a microphone corresponding to a clipping area is selected based on the position relation between the four microphones M1 to M4 and the light-receiving surface of the image sensor 16C. However, a configuration may be adopted in which, by voice data corresponding to the plurality of microphones being analyzed, a voice from a direction corresponding to a clipping area is acquired, and a microphone corresponding to the clipping area is selected. In this configuration, for example, the direction of a sound source is specified based on a comparison among shifts in time when voices reach the plurality of microphones, distances between the microphones, and sound volume values, and the like, and a microphone corresponding to that sound source direction is selected. By voice data analysis such as this, a microphone corresponding to a clipping area can be selected.

Fourth Modification Example

In the above-described embodiment, since the position relation between the four microphones M1 to M4 and the light-receiving surface of the image sensor 16C is fixed, a microphone corresponding to a clipping area can be selected based on a partial area (clipping area) on a fisheye moving image. However, the present invention is not limited thereto. By processing of excluding (prohibiting outputs from) the second microphone M2, the third microphone M3, and the fourth microphone M4 other than the microphone corresponding to the clipping area (such as the first microphone M1) from output targets, only the voice data of the microphone corresponding to the clipping area may be consequentially outputted, which can enhance flexibility.

Fifth Modification Example

In the above-described embodiment, when a clipping area is to be specified at a predetermined position on a fisheye moving image based on an orientation at the time of image capturing, an area including a person is specified as a clipping area. However, a configuration may be adopted in which a main subject such as not only a person but also an animal or the like is specified and an area including this main subject is specified as a clipping area. Also, a configuration may be adopted in which, irrespective of the presence or absence of a main subject, an area at a predetermined position on a fisheye moving image is specified as a clipping area. For example, in the case of the vertical orientation, an area at a predetermined position at the center of the image is specified. In the case of the horizontal orientation, an area at a predetermined position at a peripheral portion of the image is specified.

Sixth Modification Example

In the above-described embodiment, an image of a specified clipping area (partial area) on a fisheye moving image is enlarged and displayed. However, this image of the partial area may not be displayed. That is, a configuration may be adopted in which, when a fisheye moving image is being replayed, the guide display (such as frame display) of a partial area is performed on the fisheye moving image without the image of the partial area being displayed, a microphone corresponding to the clipping area is selected, and a voice from that microphone is replayed. This configuration allows the user to recognize a relation between a part of a fisheye moving image and a voice corresponding thereto even if the image of a partial area is not displayed.

Others

In the above-described embodiment, one wide-angle lens (fisheye lens) 16B with the viewing angle of substantially 180 degrees is used for image capturing of a half celestial sphere at 180 degrees. However, a configuration may be adopted in which two wide-angle lenses (fisheye lenses) 16B are used for image capturing of the entire celestial sphere at 360 degrees. For this image capturing of the entire celestial sphere at 360 degrees, microphones in the above-described three-dimensional arrangement are used.

Also, in the above-described embodiment, a fisheye moving image is replayed. However, data to be replayed herein is not limited to moving images, and a configuration may be adopted in which one still image is replayed and corresponding voices are replayed. Also, a configuration may be adopted in which a plurality of still images consecutively captured in a short period of time is replayed and corresponding voices are replayed in synchronization with these consecutive images.

Moreover, in the above-described embodiment, the vertical orientation or horizontal orientation is detected as an orientation of the imaging device 10 at the time of image capturing. However, the present invention is not limited thereto and, as a matter of course, the orientation may be any of other various orientations.

Furthermore, in the above-described embodiment, among all voices collected and stored for each of the plurality of microphones, a microphone that collects a voice corresponding to a specified partial area is selected, and a voice from the selected microphone is outputted as a voice corresponding to the partial area. However, the present invention is not limited thereto, and a configuration may be adopted in which all voices collected and stored for each of the plurality of microphones are used, and these voices inputted for each of the plurality of microphones are mixed and adjusted for output. Here, their voice quality, voice sound amount, and the like are changed between a voice corresponding to a partial area and a voice not corresponding thereto for output as a voice corresponding to the specified partial area.

Still further, although not described in the above-described embodiment, the present invention may be applied to a case where one subject (such as a person or an animal) mainly emits a voice. Also, a configuration may be adopted in which, when an area without a subject is specified as a partial area, no voice is outputted.

Yet still further, in the above-described embodiment, when a partial area specified on a fisheye moving image is replayed, a voice corresponding to the partial area is outputted. However, the present invention is not limited thereto, and a configuration may be adopted in which, although a fisheye moving image is displayed and a partial area thereon is specified at the time of replay, this partial area and the corresponding voice are not outputted and a relation therebetween is stored. That is, for example, a single voice-attached partial-area image file including both the image data of the specified partial area and the corresponding voice data is created in advance, and the voice and the image corresponding to that partial area are replayed by using the voice-attached partial-area image file. Also, a configuration may be adopted in which a specific area is set in advance as a partial area before image capturing, a voice corresponding to that specific area is acquired during the image capturing, and the specific area and the corresponding voice are stored at the end of the image capturing.

Yet still further, in the above-described embodiment, the present invention has been applied to a camera as an image processing device. However, the present invention may be applied to image-replay-function-equipped personal computers, PDAs (Personal Digital Assistants), tablet terminal devices, portable telephones such as smartphones, electronic timepieces, electronic game players and musical players.

Yet still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image processing device comprising:
   a memory;
   a plurality of microphones including a first microphone and a second microphone arranged in a plane and a third microphone arranged out of the plane; and
   a processor, wherein the processor is configured to perform, based on a program stored in the memory, processing including:
   acquiring at least one image;
   acquiring voices corresponding to the image;
   specifying a partial area in an entire area of the acquired image;
   clipping the specified partial area from the image;
   acquiring a voice corresponding to an image of the clipped partial area from all the acquired voices and another voice not corresponding to the image of the clipped partial area from the third microphone and at least one of the first microphone and the second microphone;
   changing sound amount between the voice and the other voice;
   mixing the voices and the other voice; and
   outputting the mixed voices.

2. The image processing device according to claim 1, wherein the processor selects a particular microphone from among the plurality of microphones, which collects a voice from a direction corresponding to the specified partial area from among all voices inputted from the plurality of microphones, and acquires the voice inputted from the particular microphone as the voice from the direction corresponding to the partial area.

3. The image processing device according to claim 2, wherein the processor acquires at least one captured and stored image as a replay target, and
   wherein the processor acquires, as a replay target, voices collected and stored in synchronization with capturing and storage of the image.

4. The image processing device according to claim 3, wherein the captured and stored image is a fisheye image captured by using a fisheye lens, and
   wherein the voices collected and stored in synchronization with the capturing and storage of the image are voices inputted from the plurality of microphones arranged in different areas around the fisheye lens.

5. The image processing device according to claim 2, wherein the processor selects, when two or more microphones from among the plurality of microphones are present which collect voices corresponding to the image of the specified partial area among all the voices collected and stored for each of the plurality of microphones, the two or more microphones and acquires a voice from the direction corresponding to the partial area by combining the voices from the two or more microphones.

6. The image processing device according to claim 1, wherein the processor acquires at least one captured and stored image as a replay target, and
wherein the processor acquires, as a replay target, voices collected and stored in synchronization with capturing and storage of the image.

7. The image processing device according to claim 6, wherein the captured and stored image is a fisheye image captured by using a fisheye lens, and
wherein the voices collected and stored in synchronization with the capturing and storage of the image are voices inputted from the plurality of microphones arranged in different areas around the fisheye lens.

8. The image processing device according to claim 1, wherein the processor excludes, from output targets, voices other than a voice from a direction corresponding to the specified partial area among all the acquired voices, and acquires the voice from the direction corresponding to the partial area.

9. The image processing device according to claim 1, wherein the processor acquires orientation information when the image is captured, and
wherein the processor specifies a partial area on a plane of the entire area of the acquired image in accordance with the acquired orientation information during image capturing.

10. The image processing device according to claim 1, wherein the processor specifies, as the partial area, a clipping area arbitrarily specified by a user operation from the acquired image.

11. The image processing device according to claim 1, wherein the processor specifies, as the partial area, an area of the image including a subject detected by image analysis being performed on the acquired image.

12. The image processing device according to claim 1, wherein the processor displays on a display section the image of the specified partial area while displaying the acquired image.

13. The image processing device according to claim 12, wherein the acquired image is a fisheye image captured by a fisheye lens, and
wherein the processor displays on the display section an image acquired by distortion correction being performed on the image of the specified partial area.

14. The image processing device according to claim 1, wherein the processor outputs the acquired voice from an output section, and
wherein the processor displays the image of the specified partial area and outputs the acquired voice.

15. The image processing device according to claim 1, wherein the processor stores the acquired voice and the image of the specified partial area in a storage section in association with each other.

16. The image processing device according to claim 15, wherein the processor stores the acquired voice and the image of the specified partial area in a same file in the storage section.

17. An image processing method for an image processing device having a memory, a plurality of microphones including a first microphone and a second microphone arranged in a plane and a third microphone arranged out of the plane, and a processor, the method comprising:
acquiring at least one image;
acquiring voices corresponding to the acquired at least one image;
specifying a partial area in an entire area of the acquired at least one image;
clipping the partial area from the acquired at least one image; and
acquiring a voice corresponding to an image of the clipped partial area from all the acquired voices and another voice not corresponding to the image of the clipped partial area from the third microphone and at least one of the first microphone and the second microphone;
changing a sound amount between the voice and the other voice;
mixing the voices and the other voice; and
outputting the mixed voices.

18. The image processing method according to claim 17, wherein a particular microphone from among the plurality of microphones is selected which collects a voice from a direction corresponding to the specified partial area from among all voices inputted from the plurality of microphones, and the voice inputted from the particular microphone is acquired as the voice from the direction corresponding to the partial area.

19. The image processing method according to claim 17, wherein at least one captured and stored image is acquired as a replay target, and
wherein voices collected and stored in synchronization with capturing and storage of the image is acquired as a replay target.

20. A non-transitory computer-readable storage medium having stored thereon a program that is executable by a program-controlled processor in an image processing device having a memory, a plurality of microphones including a first microphone and a second microphone arranged in a plane and a third microphone arranged out of the plane, execution of the program causing the processor to actualize functions comprising:
acquiring at least one image;
acquiring voices corresponding to the acquired at least one image;
specifying a partial area in an entire area of the acquired at least one image;
clipping the partial area from the acquired at least one image; and
acquiring a voice corresponding to an image of the clipped partial area from all the acquired voices and another voice not corresponding to the image of the clipped partial area from the third microphone and at least one of the first microphone and the second microphone;
changing a sound amount between the voice and the other voice;
mixing the voices and the other voice; and
outputting the mixed voices.

* * * * *